United States Patent
Laudel et al.

(10) Patent No.: US 8,385,457 B2
(45) Date of Patent: Feb. 26, 2013

(54) METHODS AND SYSTEMS TO COMPENSATE IQ IMBALANCE IN WIDEBAND ZERO-IF TUNERS

(75) Inventors: Kennan Herbert Laudel, San Jose, CA (US); Nicholas Cowley, Wiltshire (GB); Isaac Ali, Bristol (GB)

(73) Assignee: Intel Corporation, Santa Clara, CA (US)

( * ) Notice: Subject to any disclaimer, the term of this patent is extended or adjusted under 35 U.S.C. 154(b) by 758 days.

(21) Appl. No.: 12/565,381

(22) Filed: Sep. 23, 2009

(65) Prior Publication Data

US 2011/0069744 A1 Mar. 24, 2011

(51) Int. Cl.
H04L 27/10 (2006.01)
H04B 17/00 (2006.01)

(52) U.S. Cl. ........................ 375/281; 375/224

(58) Field of Classification Search .................. 375/281, 375/224, 219, 221, 259, 260, 316; 455/115.1, 455/423

See application file for complete search history.

(56) References Cited

U.S. PATENT DOCUMENTS

| | | | |
|---|---|---|---|
| 5,705,949 A | 1/1998 | Alelyunas et al. | |
| 6,330,290 B1 | 12/2001 | Glas | |
| 6,466,497 B1 | 10/2002 | Desai et al. | |
| 6,670,900 B1 | 12/2003 | Zhang | |
| 7,173,988 B2 | 2/2007 | Cochran et al. | |
| 7,184,714 B1 | 2/2007 | Kutagulla et al. | |
| 7,187,606 B1 | 3/2007 | Goel | |
| 7,668,035 B2 | 2/2010 | Chu et al. | |
| 7,830,727 B2 | 11/2010 | Arsovski et al. | |
| 8,135,055 B2 | 3/2012 | Kohlmann | |
| 2004/0063416 A1 | 4/2004 | Kuenen et al. | |
| 2009/0233562 A1 * | 9/2009 | Kim et al. | 455/115.1 |
| 2010/0165753 A1 | 7/2010 | Wijeratne et al. | |
| 2011/0069767 A1 * | 3/2011 | Zhu | 375/259 |
| 2011/0199850 A1 | 8/2011 | Yang | |
| 2011/0273945 A1 | 11/2011 | Donkoh | |

* cited by examiner

Primary Examiner — Khai Tran
(74) Attorney, Agent, or Firm — Garrett IP, LLC (57) ABSTRACT

Methods and systems to compensate IQ imbalances in a tuner system, including relatively wideband ZIF tuner systems and tuner systems having substantially linear frequency dependent phase imbalance, where a one-tap compensation element may be utilized to compensate frequency dependent phase imbalance. A two tone probe may be applied in controlled loop-back modes, and resultant baseband components may be used to determine a straight line from which to determine compensation. The probe may include a Multi-Media over Coax Alliance (MoCA) Type 2 probe. Compensation parameters may be determined as fixed or non-adaptive compensation parameters in a digital domain and may be applied at baseband. One or more compensation values may be determined in a fixed point circuit.

21 Claims, 7 Drawing Sheets

METHODS AND SYSTEMS TO COMPENSATE IQ IMBALANCE IN WIDEBAND ZERO-IF TUNERS

BACKGROUND

Frequency converters, such as zero-intermediate frequency (ZIF) tuners, may impart frequency independent IQ phase and amplitude imbalances. Associated baseband filters may impart frequency dependent phase and amplitude imbalances.

Conventional adaptive techniques to compensate IQ imbalances are relatively complex to implement and may converge relatively slowly, if at all. In some situations, such complexity may not be necessary in view of environmental factors.

BRIEF DESCRIPTION OF THE DRAWINGS/FIGURES

In the drawings, the leftmost digit(s) of a reference number identifies the drawing in which the reference number first appears.

DETAILED DESCRIPTION

Disclosed herein are methods and systems to compensate IQ imbalances in a tuner system.

The tuner system may include a relatively wideband zero intermediate frequency (ZIF) tuner. Corner frequencies of baseband filters may be extended relative to a bandwidth of the tuner system to provide substantially linear frequency dependent phase imbalance, such as where adjacent channel concerns are limited, and a one-tap compensation element may be utilized to compensate frequency dependent phase imbalance. A two tone probe may be applied in controlled loop-back modes, and resultant components may be used to determine a straight line from which to determine compensation.

The tuner system may be implemented in accordance with one or more Multimedia over Coax Alliance (MoCA) standards as promulgated and/or proposed by the MoCA at http://www.mocalliance.org/, such as to facilitate home networking on coaxial cable, which may operate in a 1 GHz microwave band, and which may include OFDM modulation.

MoCA standard 1.x provides for a Type 2 probe. MoCA standard 2.0 provides for a loopback probe for which a requesting node may perform unspecified or proprietary procedures such as loop back transceiver tests. The two tone probe disclosed above may include a Type 2 probe signal during a MoCA 2.0 loopback. The two tone probe disclosed above may also include a Type 2 probe signal sent in MoCA 1.X during a scheduled loopback period.

Compensation parameters may be determined in a digital domain from baseband probe data, and may be applied at baseband. One or more compensation values may be as fixed or non-adaptive compensation parameters, and may be determined in a fixed point circuit.

Calibration of transmit and receive paths may be performed in multiple parts. A first portion may include isolation of baseband filters in controlled loopback modes to determine frequency dependent IQ imbalance compensation from a first tone. A subsequent portion may include a full-loop back mode to determine frequency independent IQ imbalance compensation from a second tone.

Alternatively, transmit path frequency dependent and frequency independent IQ imbalance compensation may be performed together in a full loopback mode, based on a combination of the first and second tones, subsequent to calibration of receive path frequency dependent and frequency independent IQ imbalance.

One or more features disclosed herein may be may be implemented within a MoCA environment, such as to facilitate home networking on coaxial cable, which may operate in a 1 GHz microwave band, and which may include orthogonal frequency division multiplexing (OFDM) modulation.

Figure 1:
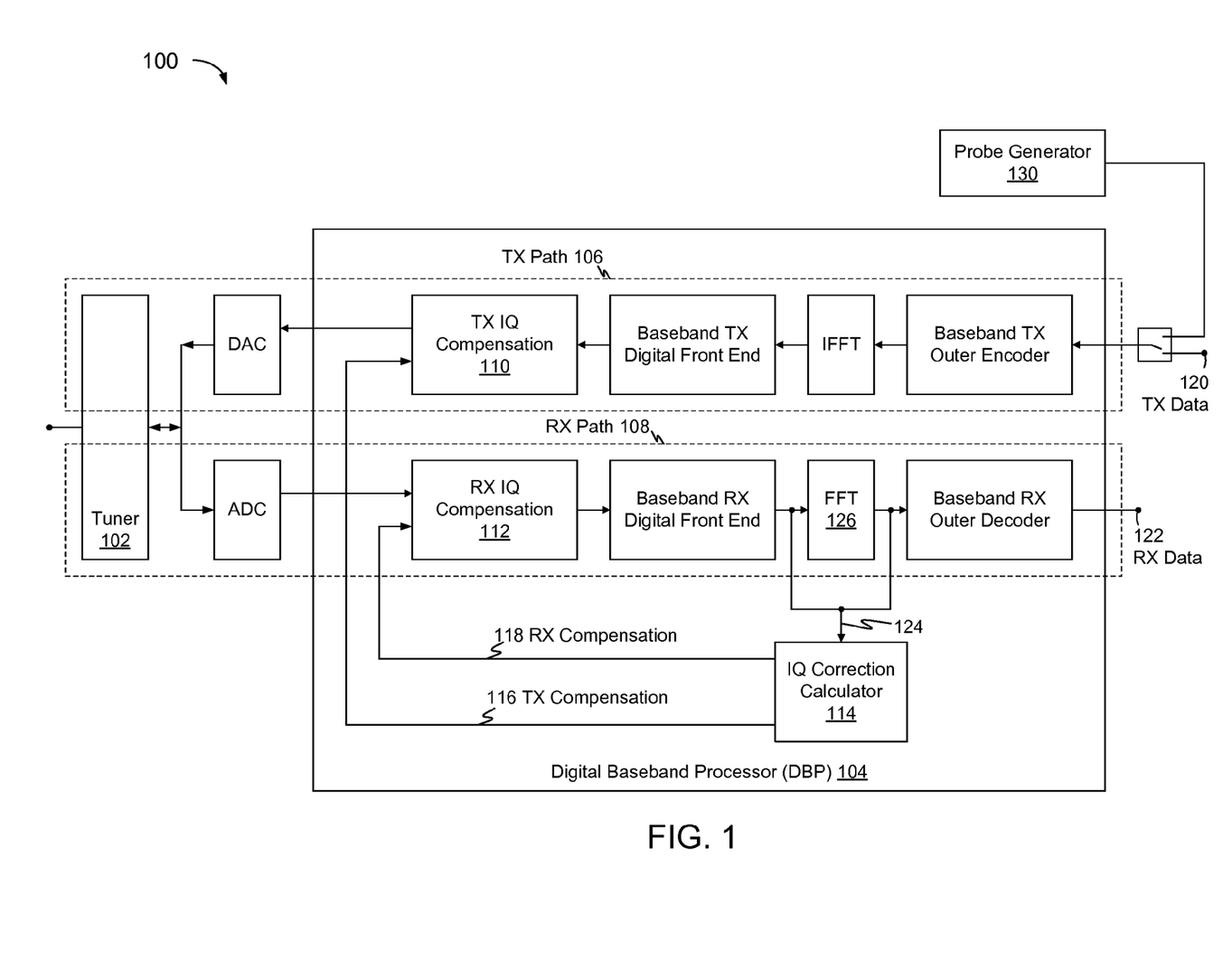
FIG. 1 is a block diagram of an exemplary transceiver system, including a tuner and a digital baseband processor (DBP).

FIG. 1 is a block diagram of an exemplary transceiver system 100, including a tuner 102 and a digital baseband processor (DBP) 104. System 100 may include a transmit portion 106 and a receive portion 108.

System 100 may be configured to transmit and receive in-phase and quadrature-phase (IQ) signals, which may lead to IQ imbalances between I and Q paths. IQ imbalances may include phase and/or amplitude imbalances.

For example, tuner 102 may include a zero intermediate frequency (ZIF) tuner, also referred to herein as a direct frequency converter and a single stage frequency converter, to up-convert and down-convert modulated signals between baseband and a transmit frequency. The ZIF tuner may introduce frequency independent IQ phase and amplitude imbalances. Baseband filters associated with the ZIF tuner may introduce frequency dependent IQ phase and amplitude imbalances.

Transmit portion 106 and receive portion 108 may include respective compensation modules 110 and 112 to compensate IQ imbalances at baseband. System 100 may include an IQ correction calculator 114 to determine IQ imbalance from baseband data 124, and to generate corresponding transmit compensation 116 and receive compensation 118.

IQ Correction Calculator 114 may be configured to receive one or more of an input to a Fast Fourier Transform (FFT) module 126 and an output of FFT module 126.

IQ correction calculator 114 may be configured to generate compensation 116 and 118 in a digital domain.

Figure 2:
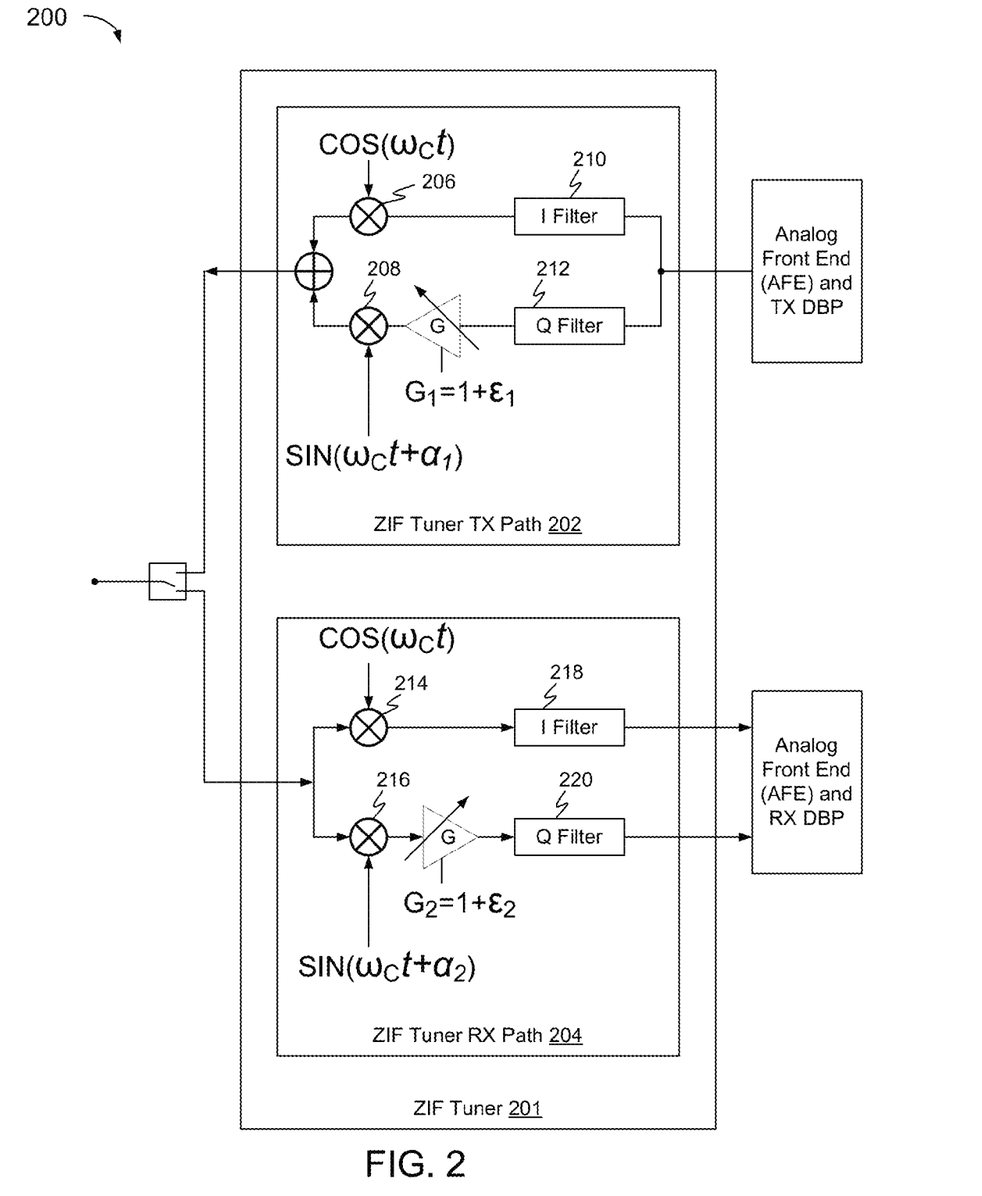
FIG. 2 is a block diagram of another exemplary transceiver system including a zero intermediate frequency (ZIF) tuner with I and Q mixers, and I and Q baseband filters.

FIG. 2 is a block diagram of an exemplary IQ transceiver system 200 including a ZIF tuner 201, including a transmit path 202 and a receive path 204. Tuner 201 may correspond to tuner 102 in FIG. 1.

Transmit path 202 includes I and Q mixers 206 and 208, and I and Q baseband filters 210 and 212. IQ imbalances introduced by mixers 206 and 208 and baseband filters 210 and 212 may be modeled as a phase difference and an amplitude gain. In the example of FIG. 2, IQ phase imbalance is modeled as $\alpha_1$ at mixer 208 and IQ amplitude imbalance is modeled as a gain $G_1=1+\epsilon_1$.

Receive path 204 includes I and Q mixers 214 and 216, and I and Q baseband filters 218 and 220. IQ phase imbalance is modeled as $\alpha_2$ at mixer 216 and IQ amplitude gain imbalance is modeled as a gain $G_2=1+\epsilon_2$.

Frequency dependent phase imbalances of tuner 201 may be substantially linear over a signal bandwidth. For example, tuner 201 may be implemented as a relatively wideband tuner, and corner frequencies of baseband filters 210, 212, 218, and 220 may extend beyond the signal bandwidth. Corner frequencies of baseband filters 210, 212, 218, and 220 may be programmable.

Such an environment may correspond to an environment where adjacent channel rejection is not a significant factor, such as in a MoCA environment. In such a situation, corner frequencies may be extended beyond a point where delay mismatch becomes non-linear. In such an environment, baseband filters 210, 212, 218, and 220 may be implemented with anti-aliasing filters.

Figure 3:
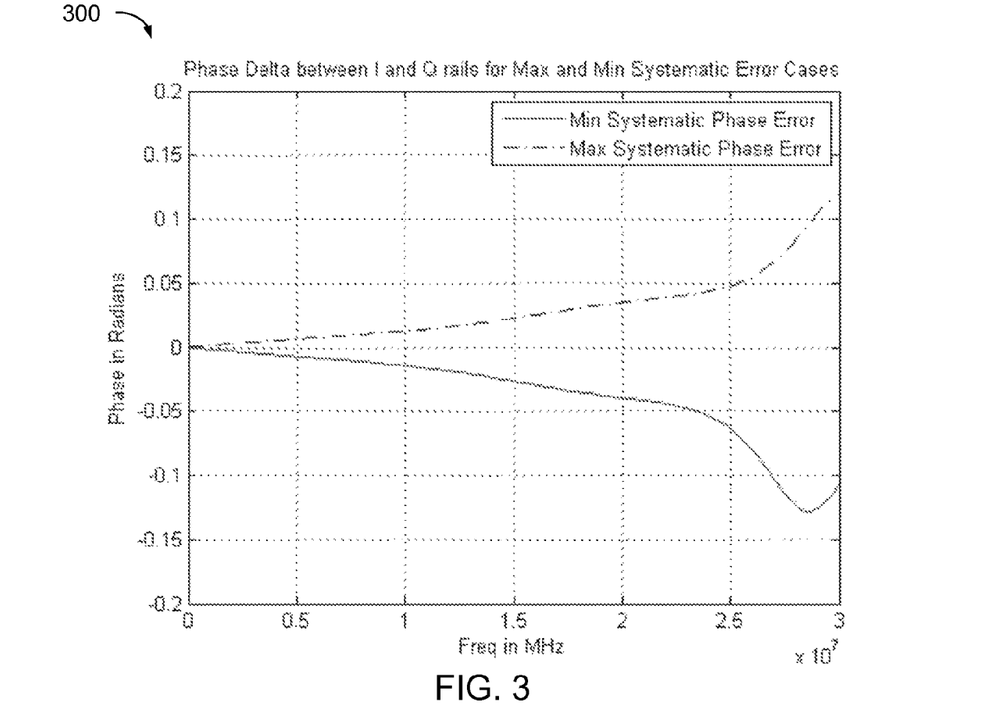
FIG. 3 is a plot of frequency dependent IQ phase imbalance associated with an exemplary ZIF tuner.

FIG. 3 is a plot 300 of frequency dependent IQ phase imbalance associated with an exemplary ZIF tuner. Exemplary plot 300 corresponds to a 5th order Chebyshev baseband filter having a cutoff frequency at approximately 34 MHz. A baseband corner frequency may correspond to approximately 34 MHz versus a baseband signal bandwidth of approximately 22 MHz.

In the example of FIG. 3, frequency dependent phase imbalance is relatively linear over a substantial portion of the illustrated frequency range, with a y-intercept at the origin. Such a frequency dependent phase imbalance may be compensated with a relatively simple delay mechanism.

In FIG. 1, where frequency dependent phase imbalances of system 100 are substantially linear over a bandwidth of system 100, compensation modules 110 and 112 may each include a single tap compensation mechanism to compensate frequency dependent phase imbalances.

Matching capabilities of baseband filters may be such that IQ frequency dependent amplitude imbalance is relatively negligible, and compensation may be omitted.

Frequency independent IQ imbalance may be modeled as a constant phase and amplitude imbalance over the bandwidth. In a MoCA environment, for example, the frequency independent amplitude imbalance may be on an order of 0.5-1.0 dB and phase imbalance may be on an order of 3-5 degrees.

Calibration may be implemented with a frequency domain probe, including first and second complex tones. The first tone may be sufficiently low in frequency such that a substantial portion of IQ imbalance is due to frequency independent sources, such as a tuner mixer, and such that any imbalance due to frequency dependent sources is substantially negligible.

The probe may include a MoCA Type 2 frequency domain probe, which may include a packet having a time domain preamble and a payload that includes two complex tones. The payload may have a variable length of between 28 and 40 OFDM symbols. The two tone locations may be variable and may be subject to one or more rules.

Calibration may include injecting a two-tone probe from a probe generator 130 into system 100, receiving the probe as data 124, and determining a straight line from one or both of the two received points or tones. System 100 may be configurable to provide a plurality of loop-back paths to provide the probe to, and to receive the probe from selected portions of system 100.

Compensation may be applied in the final baseband stage of a transmit path and in a first baseband stage of a receive path. One or more calibration measurements may utilize a FFT module in a receive path.

Figure 4:
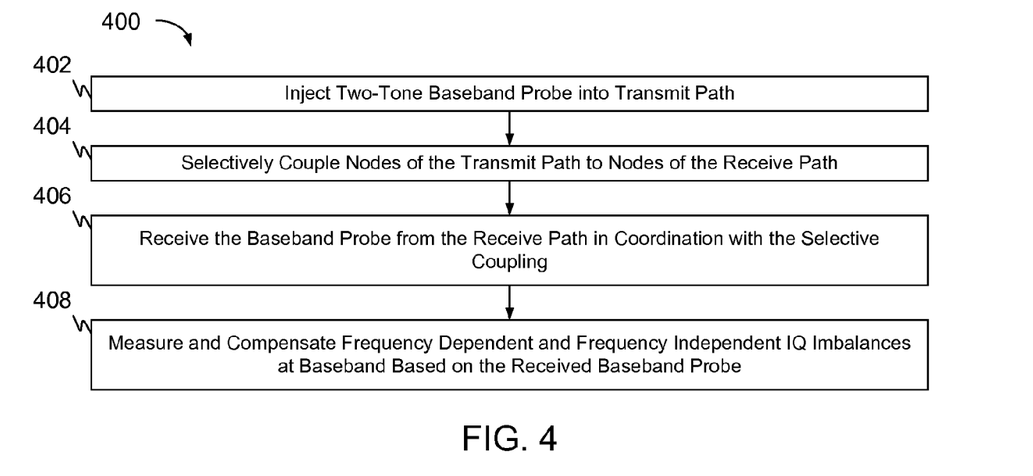
FIG. 4 is a process flowchart of an exemplary method of calibrating a transceiver using a two-tone probe.

FIG. 4 is a process flowchart of an exemplary method 400 of calibrating a transceiver using a two-tone probe.

At 402, a two-tone baseband probe is injected into a transmit path.

At 404, nodes of the transmit path are selectively coupled to nodes of the receive path.

At 406, the baseband probe is received from the receive path in coordination with the selective coupling at 404.

At 408, frequency dependent and frequency independent IQ imbalances are measured and compensated at baseband based on the received probe. Compensation may include determining a single tap compensation value to compensate frequency dependent IQ phase imbalance in the transmit path and the receive path.

Method 400 may include measuring frequency dependent IQ imbalance compensation from a first, higher frequency one of the tones, and measuring frequency independent IQ imbalance compensation from a second, lower frequency one of the tones.

Method 400 may include measuring frequency dependent receive path IQ imbalance from the first tone, and measuring frequency independent receive path IQ imbalance compensation from one of I and Q components of the second tone, such as described below with respect to FIG. 5.

Method 400 may include measuring frequency dependent transmit path IQ imbalance from the first tone, and measuring frequency independent transmit path IQ imbalance compensation from the second tone, such as described below with respect to FIG. 6.

Method 400 may include measuring frequency dependent and frequency independent transmit path IQ imbalance from a combination of the first and second tones, such as described below with respect to FIG. 7.

Figure 5:
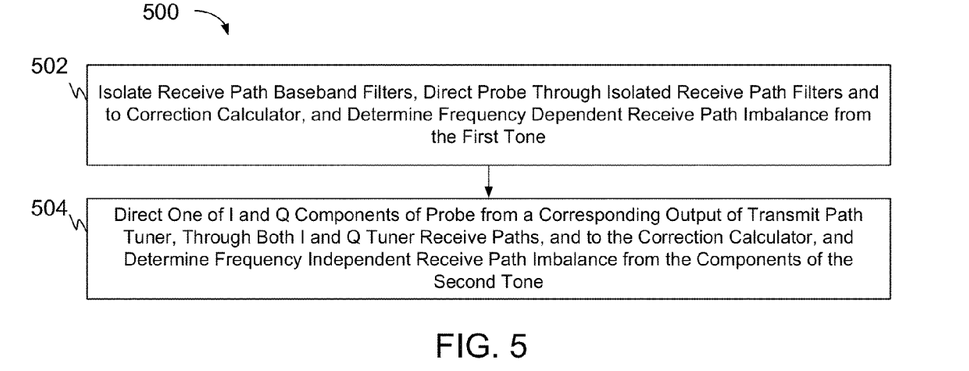
FIG. 5 is a process flowchart of an exemplary method of measuring frequency dependent receive path IQ imbalance from a first tone, and measuring frequency independent receive path IQ imbalance from a second tone.
Figure 6:
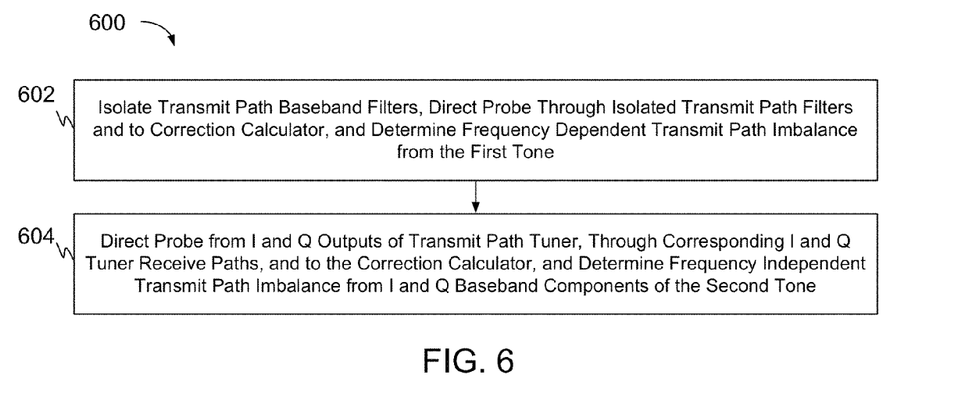
FIG. 6 is a process flowchart of an exemplary method of measuring frequency dependent transmit path IQ imbalance from the first tone, and measuring frequency independent transmit path IQ imbalance from the second tone.
Figure 7:
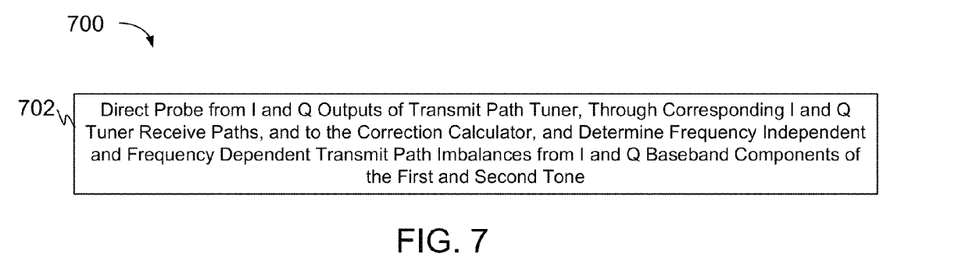
FIG. 7 is a process flowchart of an exemplary method of measuring frequency dependent and frequency independent transmit path IQ imbalance from a combination of the first and second tones.

FIGS. 5, 6, and 7 are described below with respect to FIG. 8. FIGS. 5, 6, and 7 are not, however, limited to the example of FIG. 8.

Figure 8:
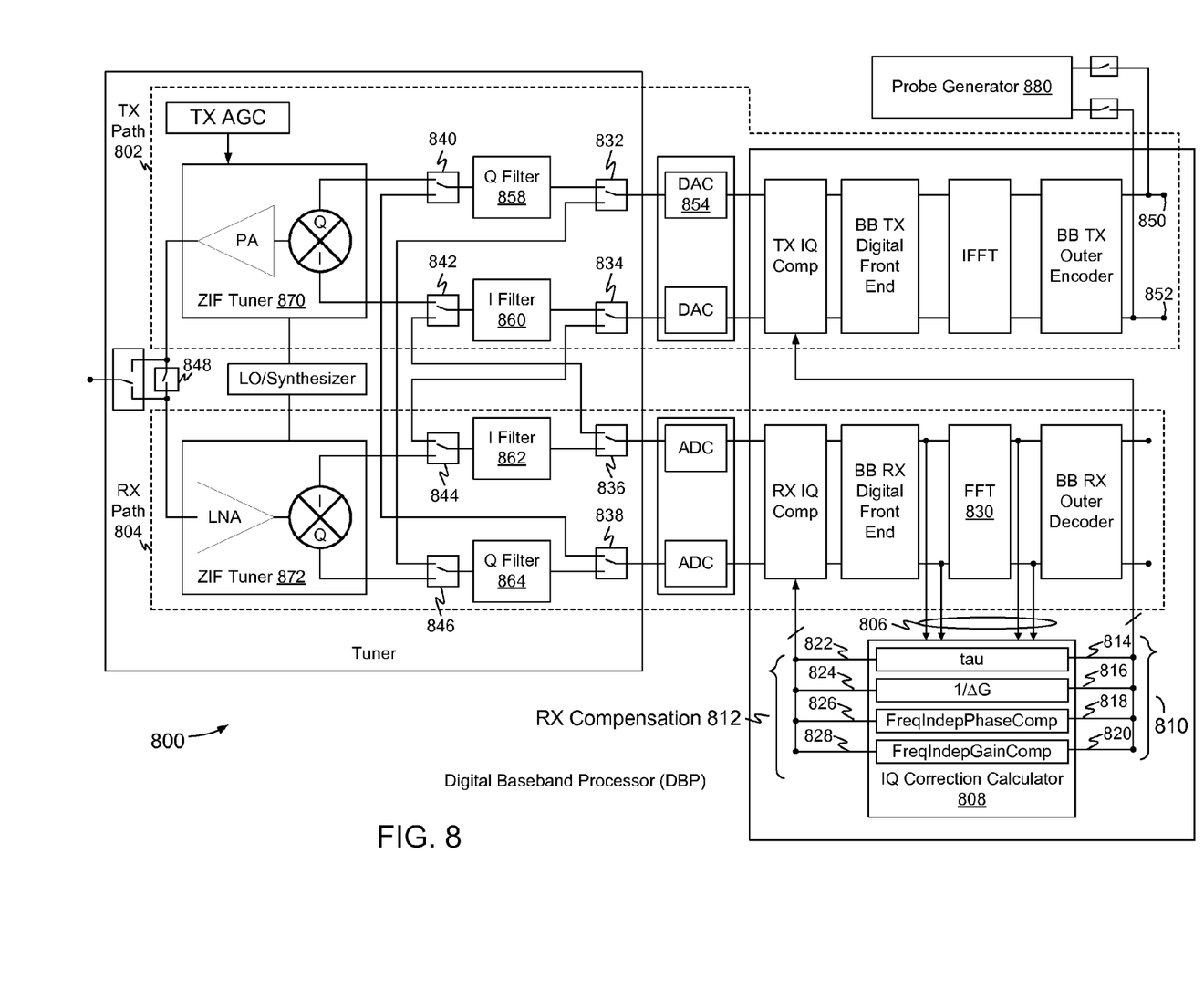
FIG. 8 is a block diagram of another exemplary transceiver system, configurable to provide a plurality of loop-back paths to obtain I and Q baseband calibration data.

FIG. 8 is a block diagram of an exemplary transceiver system 800, including a transmit path 802 and a receive path 804, configurable to provide a plurality of loop-back paths to obtain I and Q baseband data 806 at an IQ correction calculator 808.

IQ Correction Calculator 114 may be configured to receive one or more of an input to an FFT module 830 and an output of FFT module 830, and to generate transmit path compensation 810 and receive path compensation 812.

Transceiver system 800 may correspond to transceiver system 100 in FIG. 1, IQ correction calculator 808 may correspond to IQ correction calculator 114 in FIG. 1, and baseband data 806 may correspond to baseband data 124 in FIG. 1. Transmit path compensation 810 and receive path compensation 812 may correspond to transmit path compensation 116 and receive path compensation 118, respectively, in FIG. 1.

IQ correction calculator 808 may be configured to determine transmit path compensation 810 and receive path compensation 812 in a digital domain and to apply the compensation at baseband.

Transmit path compensation 810 may include one or more of: tau 814, to compensate frequency dependent IQ phase imbalance;

1/ΔG 816, to compensate frequency dependent IQ amplitude gain imbalance;

FreqIndepPhaseComp 818 to compensate frequency independent IQ phase imbalance; and FreqIndepGainComp 820 to compensate frequency independent IQ amplitude gain imbalance.

Receive path compensation 812 may include one or more of: tau 822, to compensate frequency dependent IQ phase imbalance;

1/ΔG 824, to compensate frequency dependent IQ amplitude gain imbalance;

FreqIndepPhaseComp 826 to compensate frequency independent IQ phase imbalance; and FreqIndepGainComp 828 to compensate frequency independent IQ amplitude gain imbalance.

Compensation parameters tau 814 and tau 822 may be applied to a multiplier as a one tap interpolation delay to compensate frequency dependent phase mismatch.

Exemplary equations to determine compensation parameters are disclosed further below.

In the example of FIG. 8, system 800 includes switches 832 through 848. During calibration, I and Q components of a baseband probe may be applied at transmit nodes 850 and 852, such as with a probe generator 880. Switches 832 through 848 may be controlled to direct the probe through selected portions of transmit path 802 and receive path 804, and to IQ correction calculator 808.

FIG. 5 is a process flowchart of an exemplary method 500 of measuring frequency dependent receive path IQ imbalance from the first tone, and measuring frequency independent receive path IQ imbalance from the second tone.

At 502, receive path baseband filters are isolated, the probe is directed through the isolated receive path baseband filters and to the correction calculator. Frequency dependent receive path IQ imbalance may be determined from the first tone and compensated at baseband.

In FIG. 8, I and Q components of the probe may be applied at transmit path I and Q nodes 850 and 852, respectively. The Q components may be routed from a node prior to Q filter 858 to receive path Q filter 864 by switches 832 and 846, and from Q filter 864 to IQ correction calculator 808 by switch 838. The I components may be routed from a node prior to I filter 860 to receive path I filter 862 by switches 834 and 844, and from I filter 862 to IQ correction calculator 808 by switch 836. IQ correction calculator 808 may determine frequency dependent phase and amplitude gain imbalances associated with Q filter 864 and I filter 862 from the first tone of the probe, and may determine and apply tau 822 and 1/ΔG 824 with respect to receive path 804.

At 504, one of I and Q components of the probe may be directed from an output of the transmit path tuner, into and through both I and Q receive paths, and to the correction calculator. Outputting one of I and Q components of the probe from the transmit path may avoid imparting transmit path based frequency independent IQ imbalances during receive path calibration. Frequency independent receive path IQ imbalance may be determined from corresponding baseband receive path components of the second tone and compensated at baseband.

Calibration at 504 may be performed subsequent to calibration at 502.

In FIG. 8, switches 832 through 846 may be in a normal operation configuration, and a digital codeword may be applied to a transmit path Q DAC 854, to cause Q DAC to output zero volts to Q filter 858. This may be equivalent to grounding an input to Q filter 858.

Switch 848 may direct the corresponding output of transmit path 802 to both I and Q inputs of receive path tuner 872. IQ correction calculator 808 may receive corresponding baseband components from receive path I and Q filters 862 and 864, determine frequency independent receive path IQ imbalance from components of the second tone, and output FreqIndepPhaseComp 826 and FreqIndepGainComp 828.

FIG. 6 is a process flowchart of an exemplary method 600 of measuring frequency dependent transmit path IQ imbalance from the first tone, and measuring frequency independent transmit path IQ imbalance from the second tone. Method 600 may be implemented alone and/or in combination with method 500.

At 602, transmit path baseband filters are isolated, the probe is directed through the isolated transmit path baseband filters and to the correction calculator. Frequency dependent transmit path IQ imbalance may be determined from the first tone and compensated at baseband.

In FIG. 8, switches 832, 834, 840, 842, 836, and 838 may direct the probe through transmit filters 858 and 860 and to IQ correction calculator 808. IQ correction calculator 808 may determine and output tau 814 and 1/ΔG 816.

Calibration at 602 may be performed prior to, or subsequent to calibration at 502, and/or calibration at 504.

At 604, the probe is directed from I and Q outputs of the transmit path tuner, through corresponding I and Q tuner receive paths, and to the correction calculator. Frequency independent transmit path IQ imbalance may be determined from the second tone and compensated at baseband.

In FIG. 8, switches 832 through 846 may be in a normal operation configuration, and switch 848 may direct the corresponding frequency up-converted probe to inputs of receive path tuner 872. IQ correction calculator 808 may receive corresponding baseband components of the probe, determine the frequency independent transmit path IQ imbalance from the second tone, and output FreqIndepPhaseComp 818 and FreqIndepGainComp 820.

Calibration at 604 may be performed subsequent to calibration of frequency dependent transmit path and receive path IQ imbalances and subsequent to calibration of frequency independent receive path IQ imbalance.

FIG. 7 is a process flowchart of an exemplary method 700 of measuring frequency dependent and frequency independent transmit path IQ phase and amplitude imbalance from a combination of the first and second tones. Method 700 may be performed subsequent to method 500.

At 702, the probe is directed through the transmit path, from outputs of the transmit path tuner, and into corresponding inputs of the receive path. Baseband components are directed from the receive path baseband to the correction calculator. Frequency independent and frequency dependent transmit path IQ imbalance may be determined from a combination of the first and second tones and compensated at baseband. Frequency independent and frequency dependent transmit path IQ imbalance may be determined in a single operation.

In FIG. 8, switches 832 through 846 may be in a normal operation configuration, and switch 848 may direct the corresponding frequency up-converted probe to inputs of receive path tuner 872. IQ correction calculator 808 may receive corresponding baseband components of the probe, determine the frequency independent transmit path IQ imbalance from a combination of the first and second tones, and output tau 814, 1/ΔG 816, FreqIndepPhaseComp 818, and FreqIndepGain-Comp 820. Tau 814, 1/ΔG 816, FreqIndepPhaseComp 818, and FreqIndepGainComp 820 may be determined during a single operation.

Determination and compensation of frequency independent transmit path IQ imbalance compensation at one or more of 604 and 702 may be repeated iteratively to refine compensation parameters. Iterations may be repeated until a counter exceeds a threshold.

One or more qualitative and/or quantitative measurements may be taken subsequent to a calibration. For example, a calibrated transceiver may be placed in a full loopback mode, a baseband signal may be applied to the transmit path, an IQ diagram may be generated from corresponding received baseband signal and compared to an IQ diagram of the applied signal. Comparison results may be stored as an error vector magnitude (EVM). At a later time, a second EVM may be generated in a similar fashion and compared to the first EVM to determine whether the transceiver should be recalibrated. Re-calibration may be initiated when the second EVM differs from the first EVM by a threshold amount.

The signal may correspond to an OFDM signal with a known binary phase shift keying (BPSK) sequence on individual sub-carriers, and may correspond to a MoCA Type 1 probe. Alternatively, or additionally, the signal may correspond to any fixed sequence of modulated symbols whose modulation and constellation point order in time and sub-carrier frequency is known apriori to reception a quadrature phase shift keying (QPSK) signal.

One or more of methods 400, 500, 600, and 700, or portions thereof, may be implemented to calibrate a system upon start-up and/or to re-calibrate the system during operation or steady-state.

Media access control (MAC) layer software, such is in a MoCA environment, may be configured to schedule calibrations, including controlling of switches, such as described with respect to one or more of methods 400, 500, 600, and 700.

Figure 9:
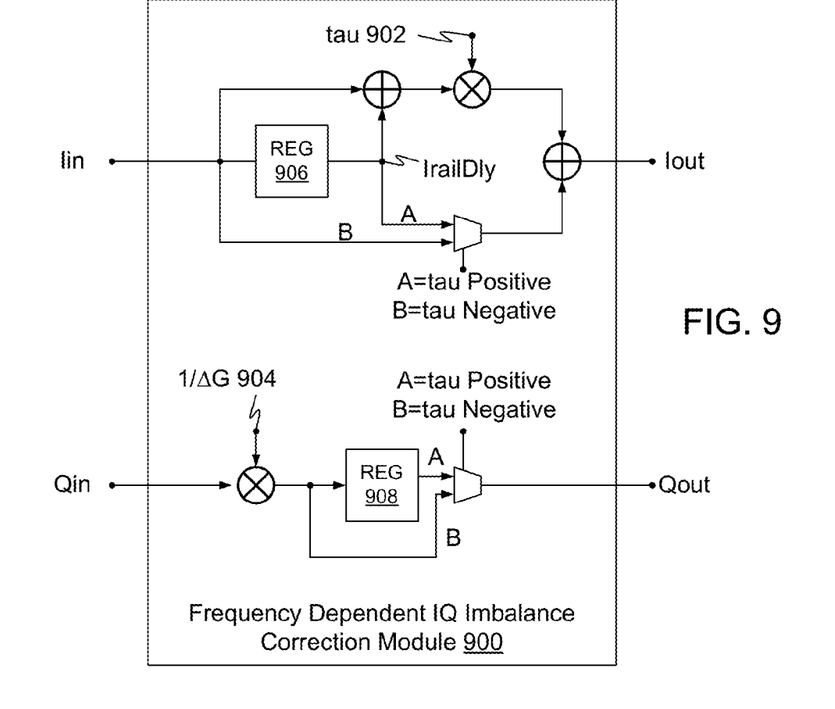
FIG. 9 is a block diagram of an exemplary correction module to apply frequency dependent compensation parameters.

FIG. 9 is a block diagram of an exemplary correction module 900 to apply frequency dependent compensation parameters tau 902 and 1/ΔG 904. Module 900 may be implemented with respect to one or more of a receive path and a transmit path. Registers 906 and 908 may be used to implement a one cycle delay of digital data. Tau 902 may correspond to one or more of tau 814 and tau 822 in FIG. 8, and 1/ΔG 904 may correspond to one or more of 1/ΔG 816 and 1/ΔG 824 in FIG. 8.

Figure 10:
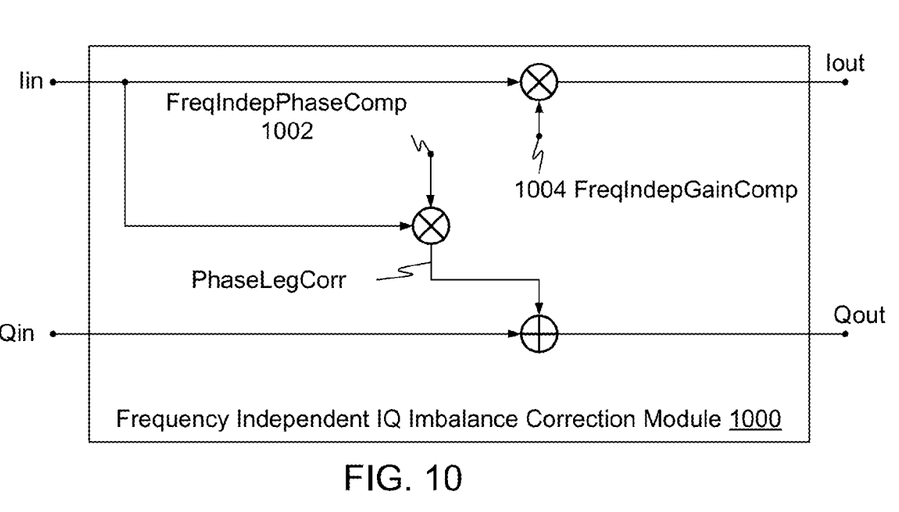
FIG. 10 is a block diagram of another exemplary correction module to apply frequency independent compensation parameters.

FIG. 10 is a block diagram of an exemplary correction module 1000 to apply frequency independent compensation parameters FreqIndepPhaseComp 1002 and FreqIndepGain-Comp 1004. Module 1000 may be implemented with respect to one or more of a receive path and a transmit path. FreqIndepPhaseComp 1002 may correspond to one or more of FreqIndepPhaseComp 818 and FreqIndepPhaseComp 826 in FIG. 8. FreqIndepGainComp 1004 may correspond to one or more of FreqIndepGainComp 820 and FreqIndepGainComp 828 in FIG. 8.

Figure 11:
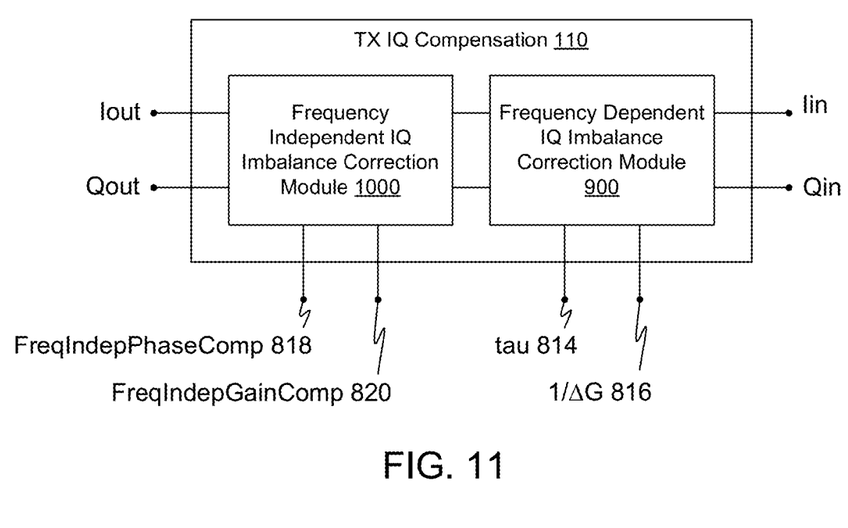
FIG. 11 is an exemplary block diagram of a transmit path IQ compensation module, including the frequency dependent IQ imbalance correction module of FIG. 9 and the frequency independent IQ imbalance correction module of FIG. 10.

FIG. 11 is an exemplary block diagram of transmit path IQ compensation module 110, including frequency dependent IQ imbalance correction module 900 and frequency independent IQ imbalance correction module 1000.

Figure 12:
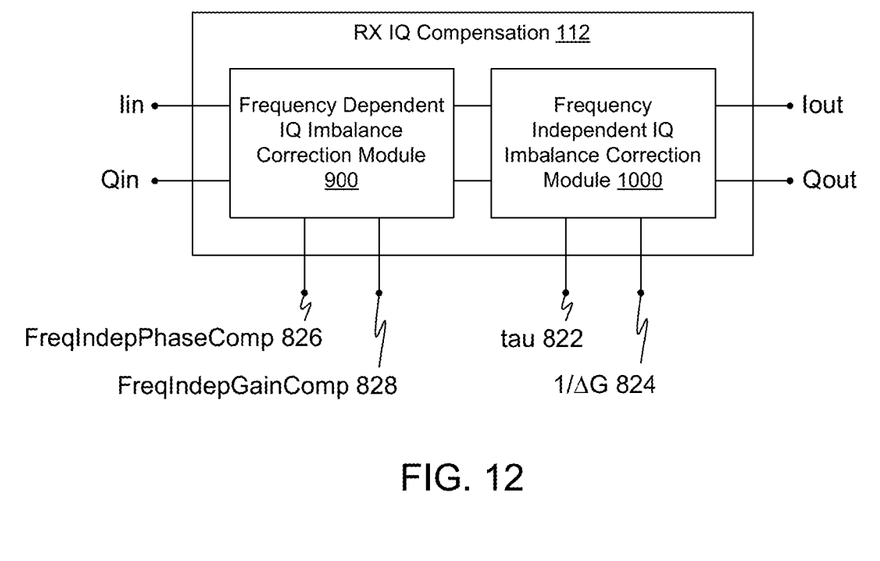
FIG. 12 is an exemplary block diagram of a receive path IQ compensation module, including the frequency dependent IQ imbalance correction module of FIG. 9 and the frequency independent IQ imbalance correction module of FIG. 10.

FIG. 12 is an exemplary block diagram of receive path IQ compensation module 112, including frequency dependent IQ imbalance correction module 900 and frequency independent IQ imbalance correction module 1000.

Exemplary methods of determining compensation parameters tau, 1/ΔG FreqIndepPhaseComp, and FreqIndepGain-Comp, are disclosed below.

A complex two tone probe may be provided to transmit path 106 in FIG. 1, at IQ nodes 120, and may be frequency up-converted on a real carrier with quadrature components on respective cosine and sine carriers. The probe may be represented in accordance equation 1.

$$Y_{TX} = A \cos \omega_k t \cos(\omega_c t + \phi) - A \sin \omega_k t \sin(\omega_c t + \phi) \quad \text{(EQ. 1)}$$

Where:
$\omega_c$ = Transmit (TX) Carrier Frequency (radian/second);
$\omega_k$ = TX Sub-Carrier (e.g., MoCA) Frequency (radian/second); and
$\phi$ = Phase Difference Between TX and RX Paths.

The signal may be received and down-converted in receive path 108 with gain and phase imbalance in accordance with equation 2:

$$R_{RX} = Y_{TX} 2 \cos \omega t - j Y_{TX} 2(1+\epsilon)\sin(\omega t + \alpha)$$

Where:
$1+\epsilon$ = Frequency Independent Gain Imbalance; and
$\alpha$ = Frequency Independent Phase Imbalance.
Equation 2 may be re-written as:

$$R_{RX} = 2A \cos \omega_k t \cos(\omega_c t + \phi) - 2A \sin \omega_k t \sin(\omega_c t + \phi)\cos \omega_c t - j2A \cos \omega_k t \cos(\omega_c t + \phi)(1+\epsilon)\sin(\omega_c t + \alpha) - j2A \sin \omega_k t \sin(\omega_c t + \phi)(1+\epsilon)\sin(\omega_c t + \alpha)$$

I and Q received components may be represented in accordance with equations 3 and 4.

$$I_{RX} = A \cos \omega_k t \cos(\phi) - A \sin \omega_k t \sin(\phi) \quad \text{(EQ. 3)}$$

$$Q_{RX} = A(1+\epsilon)\sin(\phi-\alpha)\cos \omega_k t - A(1+\epsilon)\cos(\phi-\alpha)\sin \omega_k t \quad \text{(EQ. 4)}$$

Equations 3 and 4 may be used to derive computations to determine correction factors.

The following may be computed for each of two tones. In the examples below, $F_k$ represents a probe tone and $F_{-k}$ represents an image of the tone.

form:

$$\text{Re\_sum} = \text{Re}(F_k) + \text{Re}(F_{-k}) = \frac{A}{2}\cos(\varphi) \quad \text{(EQ. 5)}$$

$$\text{Im\_sum} = \text{Im}(F_k) + \text{Im}(F_{-k}) = \frac{A}{2}(1+\varepsilon)\sin(\varphi - \alpha) \quad \text{(EQ. 6)}$$

$$\text{Re\_diff} = \text{Re}(F_k) - \text{Re}(F_{-k}) = \frac{A}{2}(1+\varepsilon)\cos(\varphi - \alpha) \quad \text{(EQ. 7)}$$

$$\text{Im\_diff} = \text{Im}(F_k) - \text{Im}(F_{-k}) = \frac{A}{2}\sin(\varphi) \quad \text{(EQ. 8)}$$

form:

$$\text{IQ\_diff} = \text{complex}(\text{Re\_diff}, \text{Im\_sum}) = \quad \text{(EQ. 9)}$$

$$\frac{A}{2}(1+\varepsilon)\cos(\varphi - \alpha) + j\frac{A}{2}(1+\varepsilon)\sin(\varphi - \alpha) = \frac{A}{2}(1+\varepsilon)e^{j\theta - \alpha}$$

-continued

IQ_sum = complex(Re_sum, Im_diff) =
$$\frac{A}{2}\cos(\varphi) + j\frac{A}{2}\sin(\varphi) = \frac{A}{2}e^{j\theta}$$

IQ_meas = $(2/A)^2 *$ IQ_diff $*$ IQ_sum$^*$ =
$$(1+\varepsilon)e^{-j\alpha} = ((1+\varepsilon)\cos(\alpha) - j(1+\varepsilon)\sin(\alpha))$$

Equation 9 may be used to determine compensation parameters, such as disclosed below.

A relatively high frequency tone may be utilized to measure frequency dependent IQ imbalance. Frequency dependent IQ gain imbalance may be substantially negligible, and the high frequency tone may be utilized to measure frequency dependent phase mismatches.

A relatively low frequency tone may be utilized to measure frequency dependent phase and gain imbalances.

Example computations are disclosed below corresponding to a first tone at a MoCA index 8 (~1 MHz) and a second tone at a MoCA index 79 (~15.4 MHz). Other tone locations may be utilized.

Determination of receive path frequency dependent IQ imbalance compensation parameters tau 822 and 1/ΔG 824 may include configuring a tuner in an isolation/loopback mode and applying the two tone probe to a transmit path, such as described above with respect to 502, and computing equation 9 for tone index 79. A CORDIC algorithm may be utilized to determine angle α.

Receive path compensation parameter tau 622 may be computed as:

$$\text{angleAlpha} = \text{angle}(IQ\_meas, k=79) \quad (EQ. 10)$$

$$\tau = (\text{angleAlpha})*(100e6/(2\pi*15.4e6)) \quad (EQ. 11)$$

Conversion for interpolation delay may take into account a frequency at which angleAlpha is measured and a corresponding sample rate. In the example above, tau is determined from a single complex tone at 15.4 MHz, with respect to a 100 MHz sample rate.

Where IQ frequency dependent amplitude imbalance is relatively negligible, frequency dependent receive compensation parameter 1/ΔG 624 may be set to 1.0.

Determination of transmit path frequency dependent IQ imbalance compensation parameters tau 814 and 1/ΔG 816 may include configuring the tuner in an isolation/loopback mode and applying the two tone probe to a transmit path, such as described above with respect to 602, and computing equation 9 for tone index 79. Frequency dependent transmit compensation parameter tau 814 may be computed from equations 10 and 11.

Determination of receive path frequency independent IQ imbalance compensation parameters FreqIndepPhaseComp 826 and FreqIndepGainComp 828 may include configuring the tuner in a full loopback mode and outputting either I or Q components of the two tone probe from the transmit path, such as described above with respect to 504, and computing equation 9 for tone index 8. Compensation parameters FreqIndepPhaseComp 826 FreqIndepGainComp 828, may be computed as:

$$\text{FreqIndepGainComp} = E = \text{real}(IQ\_meas, k=8) = (1+\varepsilon)\cos(\alpha) \quad (EQ. 12)$$

$$\text{FreqIndepPhaseComp} = P = -\text{image}(IQ\_meas, k=8) = -(1+\varepsilon)\sin(\alpha) \quad (EQ. 13)$$

Determination of transmit path frequency independent IQ imbalance compensation parameters FreqIndepPhaseComp 818 FreqIndepGainComp 820 may include configuring the tuner in a full loopback mode and outputting the two tone probe from the transmit path to the receive path, such as described above with respect to 604, and computing equation 9 for tone index 8. Compensation parameters FreqIndepPhaseComp 618 FreqIndepGainComp 620, may be computed in accordance with equations 12 and 13.

Where transmit path frequency dependent IQ imbalance, and receive path frequency independent and frequency dependent IQ imbalances are compensated prior to calibration of transmit path frequency independent IQ imbalance, any IQ imbalance, particularly at low frequencies, measured here may be substantially due to transmit path frequency independent effects.

In the examples of FIGS. 5 and 6, IQ imbalance measurements are obtained from a single tone or point, and a corresponding Y-intercept is taken as an origin. Alternatively, after receive path frequency dependent and frequency independent calibration is performed, transmit path IQ imbalance measurements may be obtained from multiple points or tones, and a straight line fit may be made between the two points, or tones. Transmit path frequency dependent and frequency independent compensation parameters may be determined from such measurements, subsequent to calibration of the receive path, such as described above with respect to method 700.

For example, the two tone MoCA probe may be applied to a tuner configured in a full loopback mode, subsequent to receive path calibration. The two tone probe may be received through the receive path and a straight line fit may be made between the two received tones. The straight line may be determined in accordance with a best fit technique. The y-axis may represent phase imbalance and the x axis may represent frequency. The y intercept may be taken as the frequency independent phase imbalance. The value of angleAlpha2 at the highest frequency tone may represent a sum of frequency independent phase imbalance and frequency dependent phase imbalance.

Transmit path compensation parameters may be determined from equations 9 and 10, and results of the best fit line (slope and y intercept), in accordance with equations 18, 19, 20, and 21.

$$\text{angleAlpha} = \text{angle}(IQ\_meas, k=8,-8) \quad (EQ. 14)$$

$$\text{angleAlpha2} = \text{angle}(IQ\_meas, k=79,-79) \quad (EQ. 15)$$

$$\text{slope} = m = (\text{angleAlpha} - \text{angleAplpha2})/(79-8) \quad (EQ. 16)$$

$$Y \text{ intercept} = b = \text{angleAplpha2} - m*8 \quad (EQ. 17)$$

FreqIndepPhaseComp 618 may be determined in accordance with equation 18.

$$P = (1+\varepsilon_{FI})\sin(\beta) \sim = (1+\varepsilon_{FI})*\beta = (1+\varepsilon_{FI})*b = \text{mag}(IQ\_meas, k=8)*b \quad (EQ, 18)$$

Where:
$\varepsilon_{FI}$=frequency independent gain error; and
β=frequency independent phase error.

Frequency dependent phase correction parameter tau 614 may be determined in accordance with equation 19.

$$\tau = (\text{angleAlpha2} - b)*(100e6/2\pi*15.4e6)) \quad (EQ. 19)$$

Where there is little or no frequency dependent amplitude imbalance, 1/ΔG may be approximately equal to 1.0.

Frequency independent amplitude correction parameter FreqIndepGainComp 620 may be determined in accordance with equation 20.

$$\text{FreqIndepGainComp} = E = \text{real}(IQ\_meas, k=8) = (1+\epsilon)\cos(\epsilon) \quad \text{(EQ. 20)}$$

At relatively low frequencies, such as k=8, substantially all amplitude imbalance may be frequency independent.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

One skilled in the art will recognize that these functional building blocks can be implemented by discrete components, application specific integrated circuits, processors executing appropriate software, and combinations thereof.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A system, comprising:
a transceiver including in-phase and quadrature phase (IQ) transmit and receive paths;
a probe generator to provide a probe including first and second baseband tones to the transmit path during a calibration mode, each tone including I and Q components;
a switching system to couple selected nodes of the transmit paths to selected nodes of the receive path to provide a plurality of loop-back paths during the calibration mode; and
a calibration system to receive the baseband tones from a baseband portion of the receive path in coordination with the switching system, determine transmit and receive path frequency dependent and frequency independent IQ compensation values in a digital domain based on the received baseband tones, and apply the compensation values to baseband portions of the transmit and receive paths during an operation mode.

2. The system of claim 1, wherein:
transmit and receive path frequency dependent IQ phase imbalances are substantially linear;
transmit and receive path frequency dependent IQ amplitude imbalances are substantially negligible;
the first tone has a higher frequency than the second tone; and
the calibration system is configured to determine the transmit and receive path frequency dependent IQ phase imbalance compensation based on the first tone, and to determine the transmit and receive path frequency independent IQ phase and gain imbalance compensation values based on the second tone.

3. The system of claim 1, wherein:
transmit and receive path frequency dependent IQ phase imbalances are substantially linear;
the first tone has a higher frequency than the second tone; and
the calibration system is configured to determine a receive path frequency dependent IQ phase imbalance compensation value based on the first tone, receive path frequency independent IQ phase and gain imbalance compensation values based the second tone, and transmit path frequency dependent and frequency independent IQ phase and gain imbalance compensation values based on a combination of the first and second tones.

4. The system of claim 1, wherein:
the transmit and receive I and Q paths each include a zero intermediate frequency (ZIF) tuner and a baseband filter having a corner frequency that extends beyond a bandwidth of a received signal;
the switching system is configured to isolate the baseband receive filters and to direct the probe through the baseband receive filters and to the calibration system; and
the calibration system is configured to determine a receive path frequency dependent IQ phase imbalance compensation value from the first tone received from the receive path.

5. The system of claim 4, wherein:
the calibration system is further configured to zero out one of an I and Q transmit path analog-to-digital converter; and
the switching system is further configured to direct the I and Q outputs of the transmit path to the corresponding I and Q inputs of the receive path, and to direct corresponding receive path baseband components to the calibration system; and
the calibration system is further configured to determine a receive path frequency independent IQ imbalance compensation value from baseband components of the second tone received from the receive path.

6. The system of claim 5, wherein:
the switching system is further configured to isolate the baseband transmit filters and direct the probe through the baseband transmit filters and to the calibration system; and
the calibration system is further configured to determine a transmit path frequency dependent IQ phase imbalance compensation value from the first tone received from the transmit filters.

7. The system of claim 6, wherein:
the switching system is further configured to direct the I and Q outputs of the transmit path to the corresponding I and Q inputs of the receive path and to direct corresponding receive path baseband components to the calibration system; and
the calibration system is further configured to determine transmit path frequency independent IQ phase and amplitude imbalance compensation values from the baseband components of the second tone received from the receive path.

8. The system of claim 7, wherein the calibration system is further configured to determine the transmit path frequency independent IQ phase and the amplitude imbalance compensation in a single operation.

9. The system of claim 5, wherein:
the switching system is further configured to direct the I and Q outputs of the transmit path to the corresponding I and Q inputs of the receive path and to direct corresponding receive path baseband components to the calibration system; and
the calibration system is further configured to determine a phase versus frequency line from first and second points corresponding to the first and second tones received from the receive path, each point including a corresponding phase and frequency, and to determine transmit path frequency dependent and frequency independent IQ phase and amplitude imbalance compensation values from the line.

10. The system of claim 5, wherein the calibration system is configured to invoke the probe generator and the switching system during a loopback mode scheduled in accordance with a communication protocol.

11. A method, comprising:
providing a frequency probe to baseband in-phase and quadrature phase (IQ) nodes of a transmit path during a calibration mode, the probe including first and second baseband tones, each having I and Q components;
coupling selected nodes of the transmit paths to selected nodes of a receive path and coupling baseband I and Q nodes of the receive path to a calibration system to provide a plurality of loop-back paths during the calibration mode; and
receiving the baseband tones from a baseband portion of the receive path in coordination with the switching during the calibration mode;
determining transmit and receive path frequency dependent and frequency independent IQ compensation values in a digital domain based on the received baseband tones; and
applying the compensation values to baseband portions of the transmit and receive paths during operation mode.

12. The method of claim 11, wherein transmit and receive path frequency dependent IQ phase imbalances are substantially linear, transmit and receive path frequency dependent IQ amplitude imbalances are substantially negligible, and the first tone has a higher frequency than the second tone, wherein the determining includes:
determining the transmit and receive path frequency dependent IQ phase imbalance compensation based on the first tone; and
determining the transmit and receive path frequency independent IQ phase and gain imbalance compensation values based the second tone.

13. The method of claim 11, wherein transmit and receive path frequency dependent IQ phase imbalances are substantially linear and the first tone has a higher frequency than the second tone, wherein the determining includes:
determining a receive path frequency dependent IQ phase imbalance compensation value based on the first tone;
determining a receive path frequency independent IQ phase and gain imbalance compensation values based the second tone; and
determining a transmit path frequency dependent and frequency independent IQ phase and gain imbalance compensation values based on a combination of the first and second tones.

14. The method of claim 11, wherein the transmit and receive I and Q paths each include a zero intermediate frequency (ZIF) tuner and a baseband filter having a corner frequency that extends beyond a bandwidth of a received signal, and wherein:
the coupling includes isolating the baseband receive filters and directing the probe through the baseband receive filters and to the calibration system; and
the determining includes determining a receive path frequency dependent IQ phase imbalance compensation value from the first tone received from the receive path.

15. The method of claim 14, wherein:
the coupling includes zeroing out one of an I and Q transmit path digital-to-analog converter, directing the I and Q outputs of the transmit path to the corresponding I and Q inputs of the receive path, and directing corresponding receive path baseband components to the calibration system; and
the determining includes determining a receive path frequency independent IQ imbalance compensation value from baseband components of the second tone received from the receive path.

16. The method of claim 15, wherein:
the coupling includes isolating the baseband transmit filters and direct the probe through the baseband transmit filters and to the calibration system; and
the determining includes determining a transmit path frequency dependent IQ phase imbalance compensation value from the first tone received from the transmit filters.

17. The method of claim 16, wherein:
the coupling includes directing the I and Q outputs of the transmit path to the corresponding I and Q inputs of the receive path and directing corresponding receive path baseband components to the calibration system; and
the determining includes determining transmit path frequency independent IQ phase and amplitude imbalance compensation values from baseband components of the second tone received from the receive path.

18. The method of claim 17, wherein the determining further includes determining the transmit path frequency independent IQ phase and amplitude imbalance compensation values in a single operation.

19. The method of claim 15, wherein:
the coupling includes directing the I and Q outputs of the transmit path to the corresponding I and Q inputs of the receive path and directing corresponding receive path baseband components to the calibration system; and
the determining includes determining a phase versus frequency line from first and second points corresponding to the first and second tones received from the receive path, each point including a corresponding phase and frequency, and determining transmit path frequency dependent and frequency independent IQ phase and amplitude imbalance compensation values from the line.

20. The method of claim 11, further including:
providing an orthogonal frequency division multiplex (OFDM) signal having a fixed sequence of modulation symbols on subcarriers of the OFDM signal, to the baseband in-phase and quadrature phase (IQ) nodes of the transmit path subsequent to calibration of the transmit and receive paths;
directing the I and Q outputs of the transmit path to the corresponding I and Q inputs of the receive path;
generating an IQ diagram from corresponding receive path baseband components of the OFDM signal;

comparing the IQ diagram to an IQ diagram of the OFDM signal provided to the baseband in-phase and quadrature phase (IQ) nodes of the transmit path;

computing and storing results of the comparison as a first error vector magnitude (EVM);

repeating the providing, directing, generating and comparing at a later time, and generating a corresponding second EVM;

comparing the first and second EVMs; and performing at least a partial re-calibration when the second EVM is greater than the first EVM by a pre-determined margin.

21. The method of claim 11, wherein the calibration system is configured to invoke the probe generator and the switching system during a loopback mode scheduled in accordance with a communication protocol.

* * * * *